(12) United States Patent
Liu et al.

(10) Patent No.: US 11,982,158 B2
(45) Date of Patent: May 14, 2024

(54) SYSTEMS AND METHODS FOR BOREHOLE TUBULAR DESIGN

(71) Applicant: Landmark Graphics Corporation, Houston, TX (US)

(72) Inventors: Zhengchun Liu, Sugar Land, TX (US); Robello Samuel, Cypress, TX (US); Adolfo Gonzales, Houston, TX (US); Yongfeng Kang, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 664 days.

(21) Appl. No.: 17/258,539

(22) PCT Filed: Mar. 24, 2020

(86) PCT No.: PCT/US2020/024462
§ 371 (c)(1),
(2) Date: Jan. 7, 2021

(87) PCT Pub. No.: WO2021/194475
PCT Pub. Date: Sep. 30, 2021

(65) Prior Publication Data
US 2022/0136370 A1 May 5, 2022

(51) Int. Cl.
*G06F 30/17* (2020.01)
*E21B 41/00* (2006.01)
*E21B 17/00* (2006.01)

(52) U.S. Cl.
CPC .............. *E21B 41/00* (2013.01); *G06F 30/17* (2020.01); *E21B 17/00* (2013.01)

(58) Field of Classification Search
CPC ........... E21B 41/00; E21B 17/00; G06F 30/17
See application file for complete search history.

(56) References Cited

U.S. PATENT DOCUMENTS 7,653,563 B2   1/2010  Veeningen et al.
10,380,281 B2  8/2019  Liu et al.
(Continued)

FOREIGN PATENT DOCUMENTS

CN   104615803 A   5/2015
EP    1009907 B1   2/2006
(Continued)

OTHER PUBLICATIONS

Liu Z, Samuel R, Gonzales A, Kang Y. New Design Limits Plot for Overview of Load-Resistance Relationship in Wellbore Tubular Design. InSPE/IADC Drilling Conference and Exhibition Mar. 6, 2018 (p. D031S016R003). SPE. (Year: 2018).*
(Continued)

*Primary Examiner* — Chuen-Meei Gan
(74) *Attorney, Agent, or Firm* — K&L Gates LLP

(57) ABSTRACT

A method for designing a borehole tubular for use in a borehole. The method may include defining tubular sections that make up the borehole tubular, defining a downhole operation that will be conducted using the borehole tubular at a first timestamp, determining loads that will be applied to each of the tubular sections at respective specific depths along the borehole during the downhole operation at the first timestamp, determining a design limit envelope for each of the tubular sections at the first timestamp based on design parameters of the tubular section and the specific depth of the tubular section at the first timestamp, and displaying a three-dimensional (3D) plot of the design limit envelopes of the tubular sections and the loads applied to the tubular sections as a function of depth within the borehole on a display.

17 Claims, 9 Drawing Sheets

(56) References Cited

U.S. PATENT DOCUMENTS

| | | | |
|---|---|---|---|
| 2006/0096753 A1 | 5/2006 | Zheng et al. | |
| 2010/0313646 A1* | 12/2010 | Mehta | E21B 47/00 |
| | | | 73/152.54 |
| 2016/0161627 A1 | 6/2016 | Khalaj Amineh | |
| 2016/0319642 A1 | 11/2016 | Ahmed | |
| 2017/0002639 A1 | 1/2017 | Thakar et al. | |
| 2020/0011169 A1 | 1/2020 | Haghshenas et al. | |
| 2020/0355063 A1* | 11/2020 | Van Vliet | E21B 44/00 |

FOREIGN PATENT DOCUMENTS

| | | |
|---|---|---|
| EP | 2870534 A1 | 5/2015 |
| EP | 2583214 A1 | 7/2019 |
| WO | 2018231256 A1 | 12/2018 |

OTHER PUBLICATIONS

International Search Report and Written Opinion for related PCT Application No. PCT/US2020/024462 filed Mar. 24, 2020.

Lin Tiejun et al, "Evaluation of casing integrity defects considering wear and corrosion—Application to casing design, Evaluation of casing integrity defects considering wear and corrosion—Application to casing design," Journal of Natrual Gas Science and Engineering, vol. 29, 2016, pp. 440-452.

Mohammed Auwalu I et al, "Casing structural integrity and failure modes in a range of well types—A review, Casing structural integrity and failure modes in a range of well types—A review," Journal of Natural Gas Science and Engineering, vol. 68, 2019, 25 pages.

* cited by examiner

SYSTEMS AND METHODS FOR BOREHOLE TUBULAR DESIGN

BACKGROUND

This section is intended to provide relevant background information to facilitate a better understanding of the various aspects of the described embodiments. Accordingly, these statements are to be read in this light and not as admissions of prior art.

During hydrocarbon recovery operations, tubular sections of a borehole, e.g., casing or tubing strings disposed within the borehole, serve as conduits through which hydrocarbons, such as oil and gas, are produced from a subsurface formation to processing facilities at the surface. Therefore, such tubular sections or components of the borehole must be sufficiently strong to withstand the pressures and stresses associated with fluid flow between the formation and borehole surface during drilling, production and stimulation operations.

In borehole tubular design, well designers typically need to visualize the resistances (typically plotted as design-limit envelopes) and various loads associated with tubular sections of a borehole tubular within a single plot. For example, such a plot allows well designers to easily check whether any load points of a particular string section lie outside the boundaries of the string's yield limits, and thereby determine whether the design can be considered "safe" for use during downhole operations. However, conventional two-dimensional (2D) design limit plots provide only design limits under standard conditions (e.g., 70° F. and 14.7 psi), without accounting for many of the actual load conditions that may be present during a hydrocarbon recovery operation or the change in the tubular section over time.

BRIEF DESCRIPTION OF THE DRAWINGS

Embodiments of the systems and methods for designing a borehole tubular are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
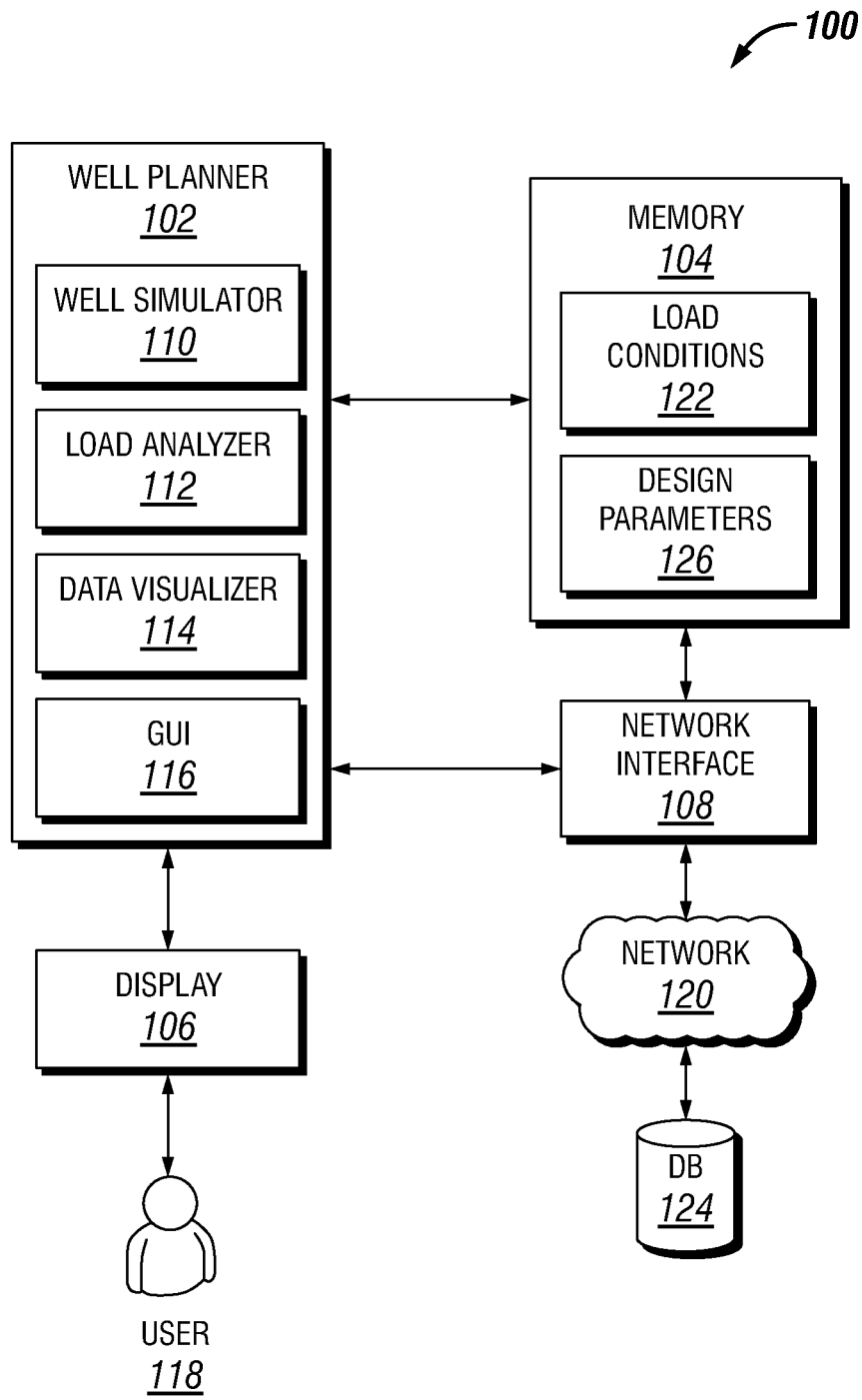
FIG. 1 is a block diagram of a system for designing a borehole tubular, according to one or more embodiments.

The present disclosure describes systems and methods for designing a borehole tubular. The systems and methods allow for visualization of the design limit envelopes and loads applied to the tubular sections that make up the borehole tubular as a function of depth within the borehole. Additionally, the systems and methods may be used to determine which tubular sections should be used to make up the borehole tubular.

The terms "tubular section" and "borehole tubular section" are used interchangeably herein to refer broadly and inclusively to any tubular element or structural component of a borehole tubular. For example, such a tubular section may be a segment of pipe (or pipe body) used for transporting fluids, e.g., oil or gas, between a subsurface reservoir formation and the surface of the borehole during hydrocarbon recovery operations. Alternatively, the tubular section may be a connector, e.g., a coupling, joint or valve assembly, between different pipe segments. A pipe segment may correspond to, for example, a portion of a casing string or a tubing string located along one or more sections of the borehole. It should be appreciated that such tubular sections may be disposed within the borehole itself, e.g., production casing within a downhole section of the borehole, or located at the surface of the borehole, e.g., a wellhead. Thus, while embodiments of the present disclosure may be described in the context of hydrocarbon recovery operations performed downhole, it should be appreciated that the borehole tubular design techniques disclosed herein are not intended to be limited to only downhole tubular sections and that these techniques may be applied to the design of both downhole and surface tubular sections of the borehole tubular.

In one or more embodiments, the design of a borehole tubular involves formulating a set of load scenarios expected during such a downhole operation and checking whether or not the load scenarios are within a design limit or minimum allowable safety margin for a particular type of load, based on each tubular section's load capacity and resistance to failure under that type of load. Each load scenario represent a combination of various design parameters and load conditions at various load points associated with specific depths along the borehole. Examples of such design parameters include, but are not limited to, material properties (e.g., pipe grade) and physical dimensions (e.g., pipe size) of the tubular sections making up the borehole tubular. Load conditions may include, but are not limited to, internal and external pressures, axial and/or torsional forces, torque, and bending momentum as a function of depth within the borehole. Examples of different types of loads that may be considered for a particular tubular section include, but are not limited to, axial, burst, collapse, and triaxial loads.

In one or more embodiments, a graphical representation of the load scenarios and design limit envelopes for a tubular section is generated and presented to a user (e.g., a well designer) as part of a workflow for designing a borehole tubular or tubular section thereof. For example, the graphical representation of load scenarios and design limit envelopes is visualized as a three-dimensional (3D) plot graph on a display of the user's computing device utilizing loads comprising axial loads and differential pressures that are calculated for each of a plurality of load points, i.e., depths, along the borehole tubular based on the corresponding load conditions at that point. The user may use such a plot to compare the loads of each load scenario represented in the plot with the design limit envelopes for the tubular sections that make up the borehole tubular. However, it should be appreciated that the comparison between the loads and design limit envelopes for the tubular section may be performed automatically without any user intervention. If all loads at their respective load points are determined to be within the design limit envelopes of the tubular section, the borehole tubular design is be considered "safe" for use during the downhole operation.

Illustrative embodiments and related methodologies of the present disclosure are described below in reference to FIGS. 1-10 as they might be employed, for example, in a computer system for the design and implementation of a borehole tubular as part of an overall well plan for a downhole operation to be performed along different sections of a borehole within a subsurface formation. For example, such a computer system is be used to visualize design limit envelopes of tubular sections and different loads at their associated depths during a design phase of the operation to be performed along a current section of the borehole. The computer system may also be used to make appropriate adjustments, such as, but not limited to selecting a different material and/or thickness for one or more of the tubular sections, based on the design limit envelopes and loads. Such adjustments are used to adjust a current design of the borehole tubular by adjusting the tubular sections that make up the borehole tubular. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

FIG. 1 is a block diagram of a system 100 for designing a borehole tubular, according to one or more embodiments. As shown in FIG. 1, system 100 includes a well planner 102, a non-transitory computer readable medium (i.e., memory 104), a display 106, and a network interface 108. In one or more embodiments, the well planner 102, the memory 104, the display 106, and the network interface 108 are communicatively coupled to one another via an internal bus of system 100. Although only the well planner 102, the memory 104, the display 106, and the network interface 108 are shown in FIG. 1, it should be appreciated that system 100 may include additional components and sub-components as desired for a particular implementation.

It should be appreciated that the well planner 102 and its components, including a well simulator 110, a load analyzer 112, a data visualizer 114, and a graphic user interface ("GUI") 116 may be implemented in software, firmware, hardware, or any combination thereof. For example, the well planner 102, the well simulator 110, the load analyzer 112, the data visualizer 114, and the GUI 116 may be implemented as components of a well planning and design application executable at system 100. Furthermore, it should be appreciated that embodiments of the well planner 102, the well simulator 110, the load analyzer 112, the data visualizer 114, the GUI 116, or portions thereof, can be implemented to run on any type of processing device including, but not limited to, a computer, a workstation, an embedded system, a networked device, or other type of processor or computer system capable of carrying out the functionality described herein.

Accordingly, system 100 may be implemented using any type of computing device having at least one processor and a processor-readable storage medium for storing data and instructions executable by the processor. Examples of such a computing device include, but are not limited to, a tablet computer, a laptop computer, a desktop computer, a workstation, a server, a cluster of computers, a set-top box, or other type of computing device. Such a computing device may also include an input/output (I/O) interface for receiving input or commands from a user 118 via a user input device (not shown). User input device may include, but not limited to, a mouse, a keyboard, a touch-screen, and/or a graphics tablet. The I/O interface also may be used by the computing device to output or present information via an output device, such as the display 106. The display 106 is coupled to or integrated with the computing device for displaying a digital representation of the information being presented to user 118. The I/O interface in the embodiment shown in FIG. 1 is in electronic communication with the GUI 116 for receiving input from user 118 and displaying information and content to user 118 based on the received input.

The memory 104 is used to store information accessible by the well planner 102 and any of its components for implementing the functionality of the present disclosure. The memory 104 may be any type of recording medium coupled to an integrated circuit that controls access to the recording medium. The recording medium can be, for example and without limitation, semiconductor memory, a hard disk, or similar type of memory or storage device. In some implementations, the memory 104 may be a remote data store, e.g., a cloud-based storage location, communicatively coupled to system 100 over a network 120 via network interface 108. The network 120 can be any type of network or combination of networks used to communicate information between different computing devices. The network 120 can include, but is not limited to, a wired (e.g., Ethernet) or a wireless (e.g., Wi-Fi or mobile telecommunications) network. In addition, the network 120 can include, but is not limited to, a local area network, medium area network, and/or wide area network such as the Internet.

As discussed above, the well planner 102 includes a well simulator 110, a load analyzer 112, a data visualizer 114, and a GUI 116. The well simulator 110 is used to simulate a downhole operation along one or more sections of the borehole. In one or more embodiments, the simulation performed by the well simulator 110 includes simulating fluid flow through the borehole tubular. The results of the simulation is then be used to determine a set of load conditions 122 at each of a plurality of load points associated with specific depths along the borehole. The load conditions 122 may include, for example and without limitation, an axial load, an internal pressure, and an external pressure at each load point. As shown in FIG. 1, the load conditions 122 may be stored in the memory 104.

Additionally or alternatively, one or more of load conditions 122 (e.g., one or more of axial load, internal pressure, and external pressure) may be determined based on input received from the user 118 via the GUI 116. For example, the user 118 may use a user input device (not shown) in electronic communication with the system 100 to specify values for one or more of load conditions 122 via UI control elements (e.g., text fields) displayed within the GUI 116.

In one or more embodiments, load conditions 122 are stored within the memory 04 after being retrieved from a remote data store or a database (DB) 124 via the network interface 108 and the network 120. The DB 124 may be any remote data storage device or system used to store any of various types of information accessible by the well planner 102 and its components via the network interface 108 and the network 120 for performing the techniques disclosed herein. For example, the DB 150 may be a materials property database that stores information related to the material or physical properties of different types of tubular sections, e.g., tubing and casing strings.

In one or more embodiments, the load analyzer 112 retrieves load conditions 122 from the memory 104 for the plurality of load points along the borehole tubular. The load analyzer 112 then determines appropriate tubular sections based on the design limit envelopes of tubular sections and a plurality of load points along the borehole tubular. The load points are associated with a particular load scenario expected for the borehole tubular design. Further, the load scenario may be one of a plurality of load scenarios expected along the tubular section of the borehole. As described above, each load scenario may be a combination of various design parameters associated with the particular tubular section.

In one or more embodiments, the load analyzer 112 initializes the compression and tension limits for compression and tension loads along the tubular section, based on design parameters 126 associated with the tubular section. The design parameters 126 include, for example, a design limit envelope and one or more design factors (e.g., an axial tension design factor and an axial compression design factor) associated with the tubular section. The design limit envelope for the tubular section may be calculated based on industry standard formulas, e.g., formulas published as part of the American Petroleum Institute (API) 5C3 or International Organization for Standardization (ISO) 10400 standards. Additionally, the design limit envelope is adjusted based on the depth of the tubular section.

In one or more embodiments, the design parameters 126 are retrieved from a materials property database, e.g., the DB 124, via the network interface 108 and network 120. In other embodiments, as shown in FIG. 1, design parameters 126 are stored in the memory 104. Together, the load conditions 122 and the design parameters 126 represent input parameters for the load analyzer 112 to determine appropriate tubular sections for the borehole tubular.

However, the initial tubular section selection may be based on an axial load, which does not take into account the internal or external pressures at the load points along the tubular section. In one or more embodiments, the load analyzer 112 calculates an equivalent axial load for each load point based on the corresponding load conditions 122. As will be described in further detail below, the equivalent axial load for a load point along the tubular section may be defined as the sum of the axial load and a counter-load pressure multiplied by a cross-sectional area of the tubular section corresponding to the load point. As the equivalent axial load for each load point is a pressure-dependent value, the load analyzer 112 may use the equivalent axial load calculated for each load point to adjust the tubular section accordingly.

In one or more embodiments, the design limit envelope may be adjusted based on appropriate values of the counter-load pressure for axial tensile and compressive loads at selected loads along the tubular section. For example, the load analyzer 112 may perform a search to find appropriate counter-load pressure values that may be used with corresponding values of the equivalent axial load to represent pressure-adjusted design limit envelopes for the depths associated with load points along the tubular section. Thus, an appropriate counter-load pressure value may be determined for a "compressive equivalent axial load" and a "tensile equivalent axial load" to determine a pressure-adjusted design limit envelope for the tubular section.

The counter-load pressure values and corresponding values of the tensile equivalent axial load and the compressive equivalent axial load are used to adjust the tubular section used at a particular depth (i.e., selecting a tubular section with different design parameters). In one or more embodiments, the data visualizer 114 displays a visualization of the above-described design limit envelopes via the display 106. The load points are associated with at least one of a plurality of load scenarios formulated for different types of downhole operations. Examples of such downhole operations include, but are not limited to, drilling, production, and stimulation operations. In one or more embodiments, the visualization is a plot graph including a graphical representation of the load points relative to the design limit envelopes for the tubular sections at various depths along the borehole. Plots for a single design limit envelope and equivalent axial load at a specific depth are shown in FIGS. 3-6, as will be described in further detail below.

Figure 2:
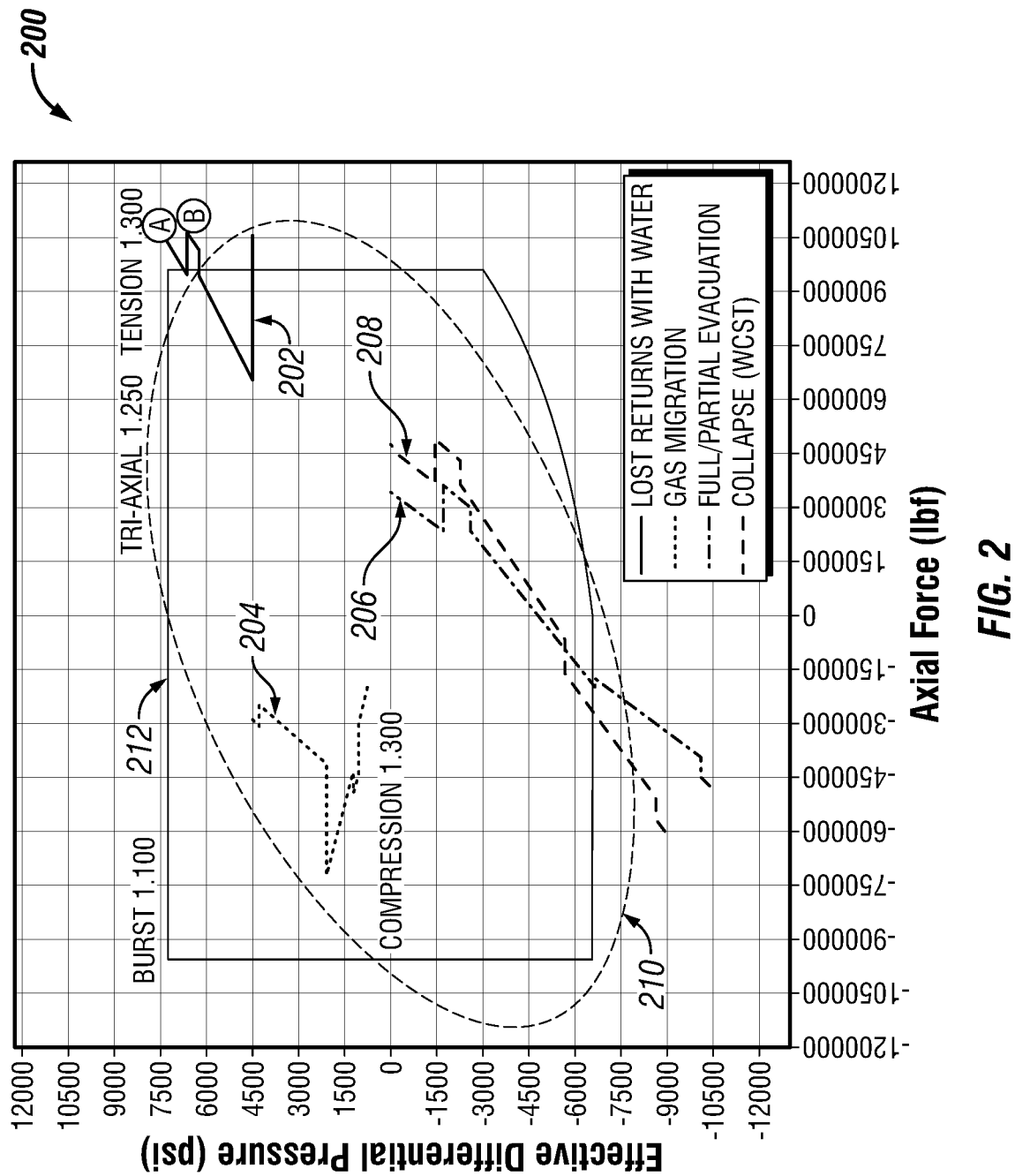
FIG. 2 is a two-dimensional (2D) plot of different load scenarios and design limit envelopes for a borehole tubular, according to one or more embodiments.

FIG. 2 is a two-dimensional (2D) design limit envelope plot 200 of different load scenarios and design limit envelopes for a borehole tubular. As shown in FIG. 2, different load lines within the design limit envelope plot 200 may be used to represent a plurality of load scenarios 202, 204, 206 208 for a particular tubular section of the borehole tubular. As described above, each load scenario represents a different combination of design parameters and load conditions for a particular type of load at various load points along the tubular section. Examples of such design parameters include, but are not limited to, material properties and dimensions of the tubular section.

The x-axis of the design limit envelope plot 200 as shown in FIG. 2 is used to represent axial force and the y-axis is used to represent effective differential pressure. However, it should be appreciated that embodiments are not intended to be limited thereto. The effective differential pressure ($\Delta Pe$) may be determined using, for example, Equations (1) and (2) for burst loads and collapse loads, respectively:

$$\Delta P_e = P_i - P_o$$

$$\Delta Pe = P_i - P_o - \frac{2t}{D} - P_i$$

where Pi is the internal pressure within the tubular section, Po is the external pressure on the tubular section, D is the pipe outer diameter, and t is the pipe wall thickness.

To evaluate the yield strength of the wellbore tubular design under combined loading conditions, the load scenarios 202, 204, 206 208 are compared to a triaxial design limit envelope 210 and an API design limit envelope 212. For example, as the load points labeled "A" and "B" are located outside of triaxial design limit envelope 210 and API design limit envelope 212 in the design limit envelope plot 200, the corresponding load conditions at these points are considered "unsafe" for the design of the particular tubular section. Such unsafe load points indicate points of yield failure, where the triaxial stress due to the expected load conditions exceeds the yield strength of the wellbore tubular design. While only load points A and B associated with load scenario 202 are shown in FIG. 2, it should be appreciated that load points associated with other load scenarios also may be shown as part of the visualization included with the design limit envelope plot 200, e.g., as displayed via the display 106 of FIG. 1, as described above.

In one or more embodiments, triaxial design limit envelope 210 represents a minimum allowable margin of safety that is required for a design of the tubular section to avoid failure under triaxial loads expected during the downhole operation. The triaxial design limit envelope 210 is based on one or more design factors (e.g., design parameters 126 of FIG. 1, as described above) and triaxial ratings for burst and collapse loads. The design factors may represent, for example, minimum allowable safety factors for burst and collapse loads that the tubular section is expected to withstand during the downhole operation. The value of such a design factor may account for uncertainties in design parameters affecting the collapse resistance and strength of the tubular section's structure. In one or more embodiments, the value of the design factor are determined based on a model of the load conditions and resistance. Such a model may be generated based on historical data of the loads and resistance associated with wellbore tubular designs used in prior hydrocarbon recovery operations.

In one or more embodiments, API design limit envelope 212 represents a combination of the following design limits—an axial tension limit; an axial compression limit; an API burst limit; and an API collapse limit. The API collapse limit is based on an API collapse formula that already accounts for internal pressure. Likewise, the API burst limit is independent of axial force and external pressure. Therefore, no adjustments to these API design limits or API design limit envelope 212 are needed to account for any additional pressure effects on the wellbore tubular design under consideration.

Figure 3:
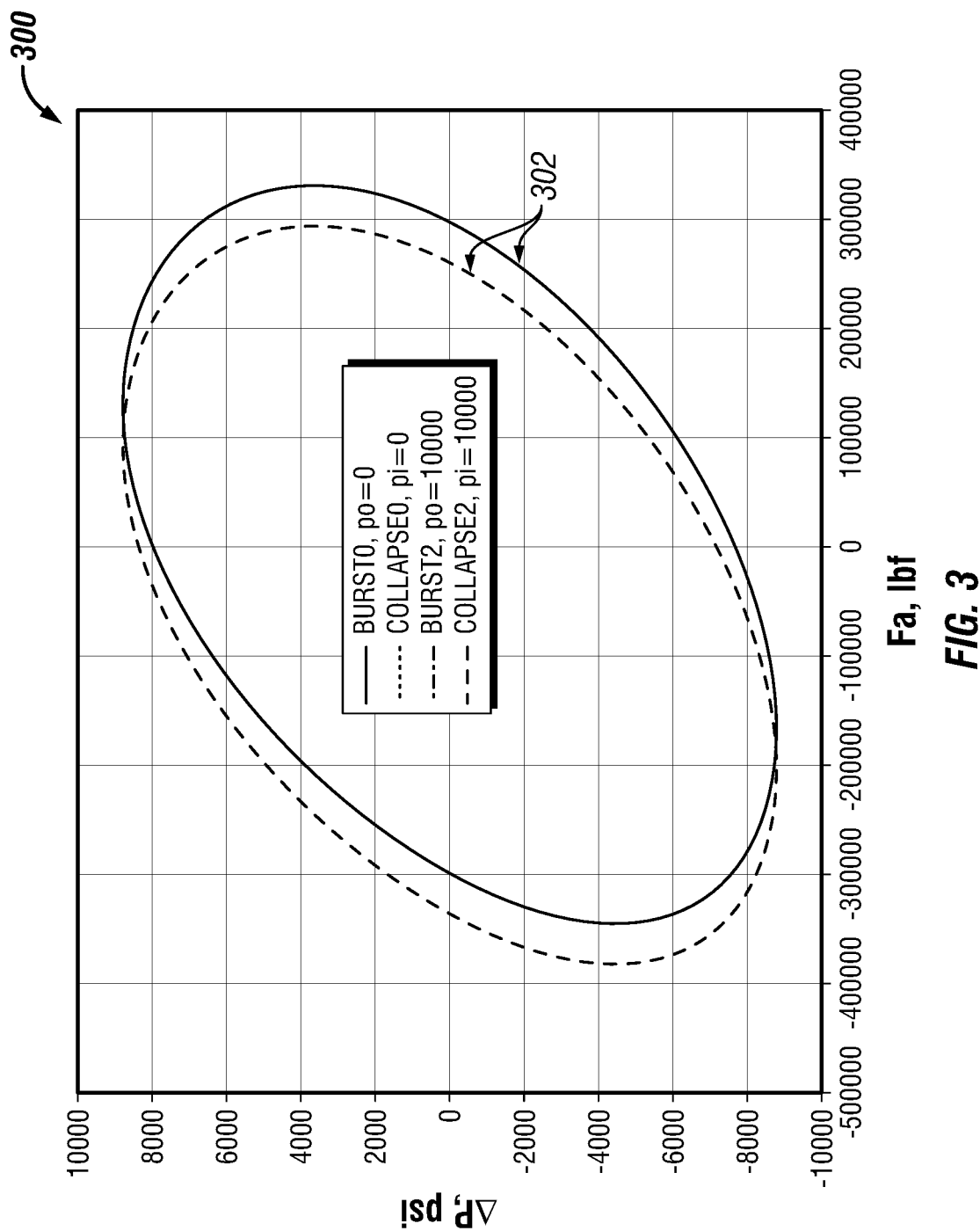
FIG. 3 is a 2D design limit envelope plot, according to one or more embodiments.

By contrast, the triaxial burst ratings and triaxial collapse ratings associated with triaxial design limit envelope 210 may be dependent upon external pressure and internal pressure, respectively. Therefore, adjustments to triaxial design limit envelope 210 may be needed to effectively account for the effects of such counter-load pressures. For example, assuming a von Mises yield criterion with zero torsional stress, the addition of internal and external pressures may cause triaxial design limit envelope 210 to shift along one or more axes of the design limit envelope plot 200, as shown in FIG. 3. FIG. 3 is a 2D design limit envelope plot 300 showing a triaxial design limit envelope 302 shifting along the x-axis due to internal (Pi) and external (Po) counter-load pressures. In one or more embodiments, the degree to which triaxial design limit envelope 302 shifts are based on von Mises criteria for the material yield strength of the tubular section, as expressed by Equations (3) and (4), respectively:

$$YS^2 = (\sigma_z + P_i)^2 - j(\sigma_z + P_i)\Delta P + j^2 \Delta P^2 \text{ for } P_i < P_o$$

$$YS^2 = (\sigma_z + P_i)^2 - (2-j)(\sigma_z + P_o)\Delta P + (1-j-j^2)\Delta P^2 \text{ for } P_i > P_o$$

where YS is yield strength, $\sigma_z$ is axial stress, $\Delta P = P_i - P_o$, and $j = 2A_o/(A_o - A_i)$, where $A_o$ is external circle area and $A_i$ is internal circle area Referring back to FIG. 2, triaxial design limit envelope 210 may provide only an approximation of the actual triaxial envelope for the tubular section, as the influence of counter-load pressure is not taken into account when plotting true axial force along the x-axis as in plot graph 200. The resulting inconsistency becomes significant with larger values of the counter-load pressure, e.g., values of internal pressure (Pi) greater than 10000 psi. Also, as the effective differential pressure for burst loads and collapse loads are determined in different ways, e.g., using Equation (1) and Equation (2), respectively, values of the effective differential pressure plotted along the y-axis of the design limit envelope plot 200 for burst loads may be inconsistent with those for collapse loads.

In one or more embodiments, such inconsistencies are resolved in part by using an equivalent axial load in place of axial force for the x-axis. In one or more embodiments, the equivalent axial load (Feq) are determined using Equation (5) as follows:

$$F_{eq} = F_a + \min(P_i - P_o)A_s$$

where $F_a$ is axial force (or "axial load"), $P_i$ is internal pressure, $P_o$ is external pressure, and $A_s$ is the cross-sectional area of the tubular section corresponding to one or more load points. The cross-sectional area (As) may be determined using Equation (6) as follows:

$$A_s = A_o - A_i$$

where $A_o$ is the cross-sectional area based on an outer diameter of the tubular section and $A_i$ is the cross-sectional area based on an inner diameter of the tubular section.

Equation (5) above for the equivalent axial load is based on an equivalent axial stress ($\sigma_{eq}$) for triaxial collapse and burst ratings, as expressed using Equations (7) and (8), respectively:

$$\sigma_{eq} = \sigma_a - P_i$$

$$\sigma_{eq} = \sigma_a - P_o$$

where $\sigma_a$ is a component of axial stress that is not due to bending and, as described above, $P_o$ and $P_i$ are external pressure and internal pressure, respectively.

In addition to using equivalent axial load for the x-axis, differential pressure may be used in place of effective differential pressure for the y-axis. This is consistent with the API collapse rating formula according to the 2015 Addendum to the API 5C3 standards, in which effective differential pressure is replaced by differential pressure and internal pressure ($P_i$) is treated as equivalent axial stress. The API collapse rating formula may be as expressed using Equation (9):

$$f_{yycom} = \left\{ \left[1 - .75\left(\frac{\sigma_a + P_i}{f_{ymn}}\right)^2\right]^{\frac{1}{2}} - .5\left(\frac{\sigma_a + P_i}{f_{ymn}}\right) \right\} f_{ymn} \text{ for } \sigma + P_i \geq 0$$

where $F_{yycom}$ is the combined loading equivalent grade, the equivalent yield strength in the presence of axial stress and internal pressure; $f_{ymn}$ is the specified minimum yield strength; $\sigma_a$, is the component of axial stress not due to bending; $P_i$ is the internal pressure; and $P_c$ is the collapse resistance.

A plot with equivalent axial load as the x-axis and differential pressure as the y-axis allows both internal and external pressures to be taken into account when plotting the triaxial design limit envelope. Accordingly, such a plot also allows the triaxial design limit envelope for collapse and burst loads, e.g., based on Equations (7) and (8), respectively, to be consistent with the collapse and burst limits of the API design limit envelope, e.g., based on Equations (3) and (4), respectively. Such a plot is shown in FIG. 4.

Figure 4:
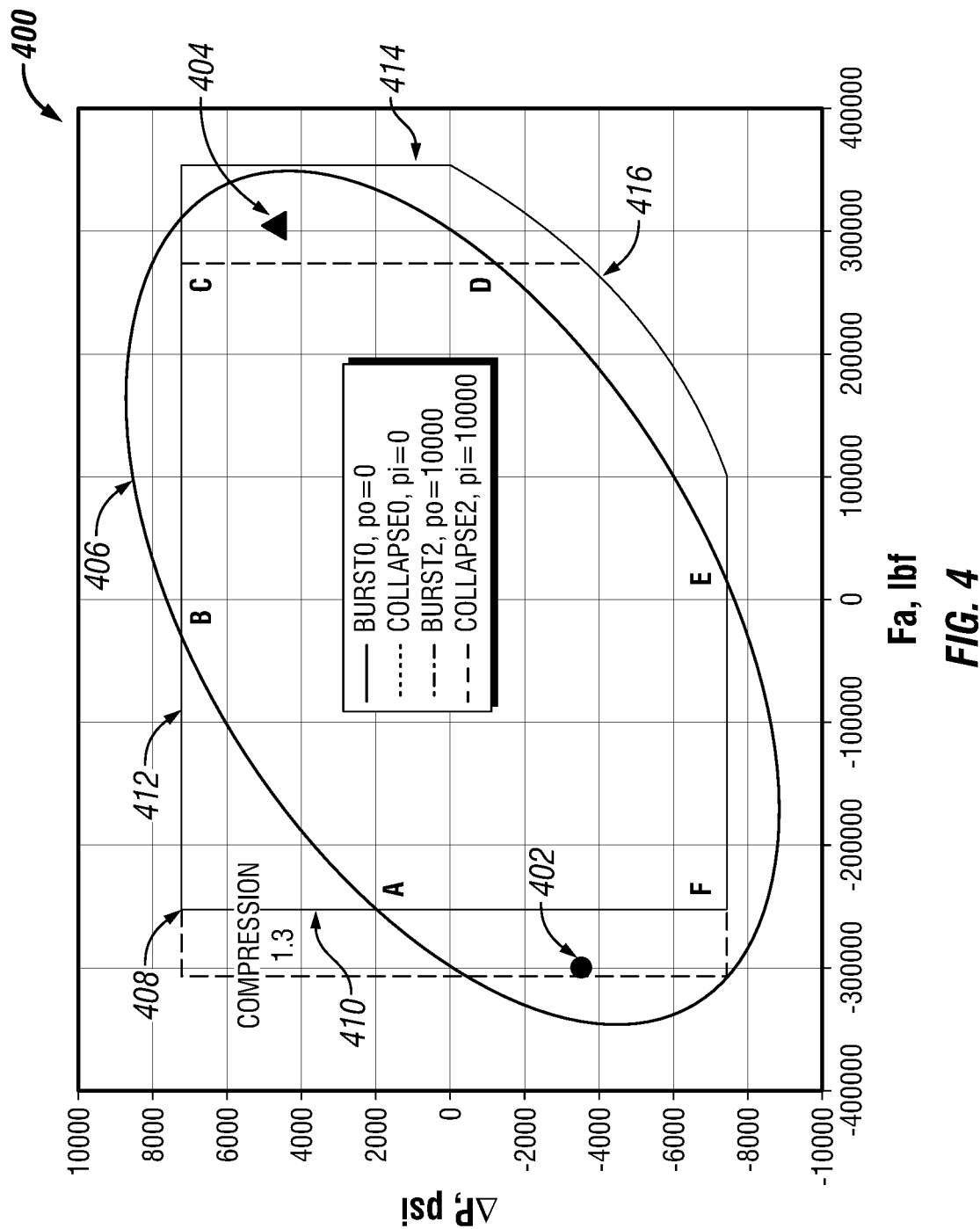
FIG. 4 is a 2D design limit envelope plot superimposed with the burst/collapse envelopes and tension/compression envelopes, according to one or more embodiments.

FIG. 4 is a design limit envelope plot 400 of equivalent axial load (Feq) versus differential pressure (ΔP) for different sets of load points relative to API and triaxial design limit envelopes. Load point 402 is a load point associated with a tubular section at a specific depth for a particular load scenario for the borehole tubular. Likewise, load point 404 is a load point associated with a tubular section at specific depth for a different load scenario for the borehole tubular. The load points in design limit envelope plot 400 are shown relative to a triaxial design limit envelope 406 and an API design limit envelope 408. The API design limit envelope 408 is composed of four parts: an axial compression limit 410, an axial tension limit 412, an API burst limit 414, and an API collapse limit 416.

As described above, the API collapse limit 425 already accounts for the effects of internal pressure and the API burst limit 423 is independent of axial force and external pressure. Therefore, no adjustment is necessary for the API burst limit 414 and the API collapse limit 416. However, adjustments to the axial compression limit 410 and the axial tension limit 410 may be needed in order to maintain consistency between the triaxial design limit envelope 406 and the API design limit envelope 408 and thereby, allow proper comparisons to be made between these design limit envelopes using the design limit envelope plot 400. Additionally, the change in minimum yield strength and, therefore, the design limit envelope of the tubular section due to temperature at the specific depth are be taken into account when determining both the triaxial design limit envelope 406 and the API design limit envelope 408.

In conventional plots with axial force as the x-axis, the tension and compression limits for true axial force are typically determined using Equations (10) and (11), respectively, as follows:

$$F_{a1} = F_y/DF_1$$

$$F_{a2} = F_y/DF_2$$

where $F_{a1}$ and $F_{a2}$ represent the tension and compression limits for axial force, respectively, Fy is an axial rating of the tubular section, $DF_1$ is an axial tension design factor and $DF_2$ is an axial compression design factor. However, it should be appreciated that, in some implementations, the same design factor may be used for both tensile and compressive axial loads.

By contrast, equivalent axial load ($F_{eq}$) replaces axial force in the plots (e.g., design limit envelope plot 400) generated using the techniques disclosed herein and as described above, values of the equivalent axial load (according to Equation (5) above) are pressure-dependent. In one or more embodiments, a counter-load pressure may be used to compensate for the effects of internal and external pressures on the equivalent axial load. For example, appropriate values of the counter-load pressure may be determined so that corresponding values of the equivalent axial load may be used to effectively represent pressure-adjusted tension and compression limits within the design limit envelope plot 400. Accordingly, the adjusted tension and compression limits provide a way to correctly display uniaxial design limits within a triaxial design limit envelope plot.

In one or more embodiments, values of an equivalent axial load ($F_{eq1}$) representing a pressure-adjusted tension limit are determined based on values of a counter-load pressure ($P_1$) and a cross-sectional area (As) of the tubular section, as expressed by Equation (12):

$$F_{eq1} = \frac{F_y}{DF_1} + P_1 * A_s$$

Likewise, values of an equivalent axial load ($F_{eq1}$) representing a pressure-adjusted compression limit are determined based on values of a counter-load pressure ($P_2$) and the tubular cross-sectional area ($A_s$), as expressed by Equation (13):

$$F_{eq2} = \frac{F_y}{DF_2} + P_2 * A_s$$

In one or more embodiments, appropriate values of $P_1$ and $P_2$ are determined based on a search of corresponding pressure values at selected load points along the tubular section. The selection criteria for load points and pressure values used to adjust the axial compression and tension limits may include: (1) all "unsafe" load points (e.g., load points at which an axial safety factor (SF) is less than or equal to $DF_1$ or $DF_2$) must be located outside the API design limit envelope; and (2) for all "safe" load points, the relative distance between the load points and axial limits along the x-axis of design limit envelope plot 400 should change as little as possible.

As shown in FIG. 4, the dotted lines in design limit envelope plot 400 represent the initial compression limit 410 and the initial tension limit 412, prior to being adjusted according to the appropriate counter-load pressure values determined for each limit Based on the adjusted limits, a safe design for the tubular section is one in which all load points fall within the innermost envelope defined by points A-B-C-D-E-F-A. While uniaxial design limits are shown together with triaxial design limits in design limit envelope plot 400, it should be appreciated that embodiments are not limited thereto. For example, in some embodiments, the design limit plot may include separate content areas for visualizing uniaxial and triaxial design limits, as shown in FIG. 5.

Figure 5:
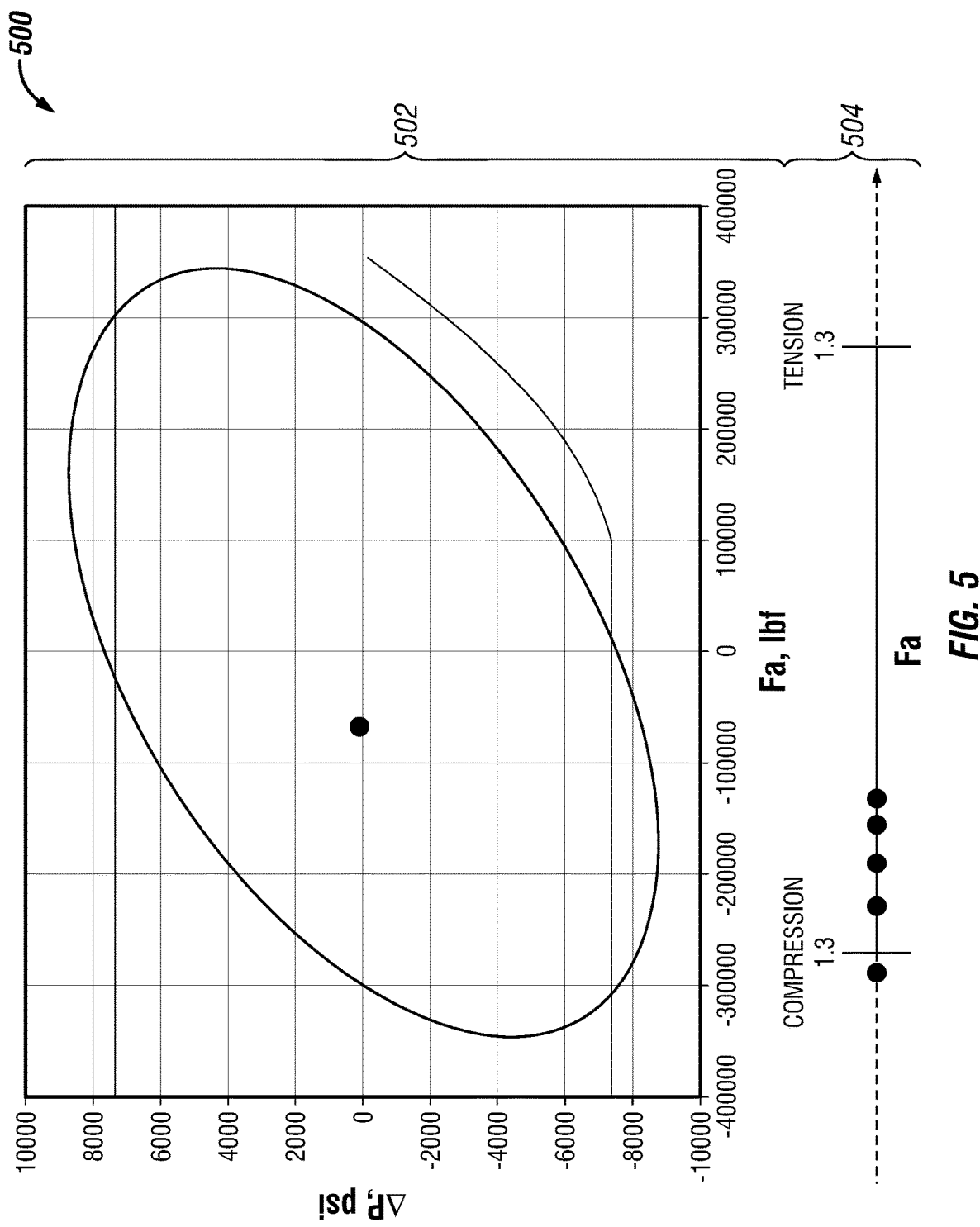
FIG. 5 is a 2D design limit envelope plot superimposed with the burst/collapse envelopes and 1D tension/compression plot, according to one or more embodiments.

FIG. 5 is a design limit envelope plot 500 including a content area 502 for displaying triaxial design limits and a separate content area 504 for displaying uniaxial design limits for a load point associated with a tubular section at a specific depth for a particular load scenario for the borehole tubular. In one or more embodiments, design limit envelope plot 500 is visualized via a GUI (e.g., GUI 116 of FIG. 1, as described above) of a well planning and design application executable at a computing device or system (e.g., system 100 of FIG. 1, as described above) of a user, e.g., a well designer. Such a GUI may provide various controls for the user to switch between different views of the design limit plot and design limits therein. For example, the GUI may provide controls enabling the user to switch between the separate view of uniaxial and triaxial design limits as shown in design limit envelope plot 500 and a combined view of these design limits as shown in design limit envelope plot 400 of FIG. 4, as described above.

The GUI may also provide controls, e.g., via a user control menu or dialog window, for switching between different views showing pressure-adjusted axial design limits, the initial design limits only, or both the initial and adjusted limits. It should be appreciated that any number of additional controls may be provided for controlling or customizing different visual aspects of the design limit plot and design limit visualizations displayed therein, as desired for a particular implementation. Such a design limit plot allows the user or well designer to easily check if all axial loads are within the tension/compression limits for a particular wellbore tubular design under consideration, where such axial limits have been appropriately adjusted or optimized based on a pressure-dependent equivalent axial load.

While the design limit envelope plots shown in FIGS. 2-5 are described in the context of axial loads at load points along a tubular section of a wellbore, it should be appreciated that the disclosed tubular design techniques are not intended to be limited thereto and that the these techniques may also be used to determine and visualize pressure-adjusted or optimal design limits for axial loads at connection points between different segments of the wellbore tubular, as will be described with respect to the yield strength plot 200 illustrated in FIG. 2.

Figure 6:
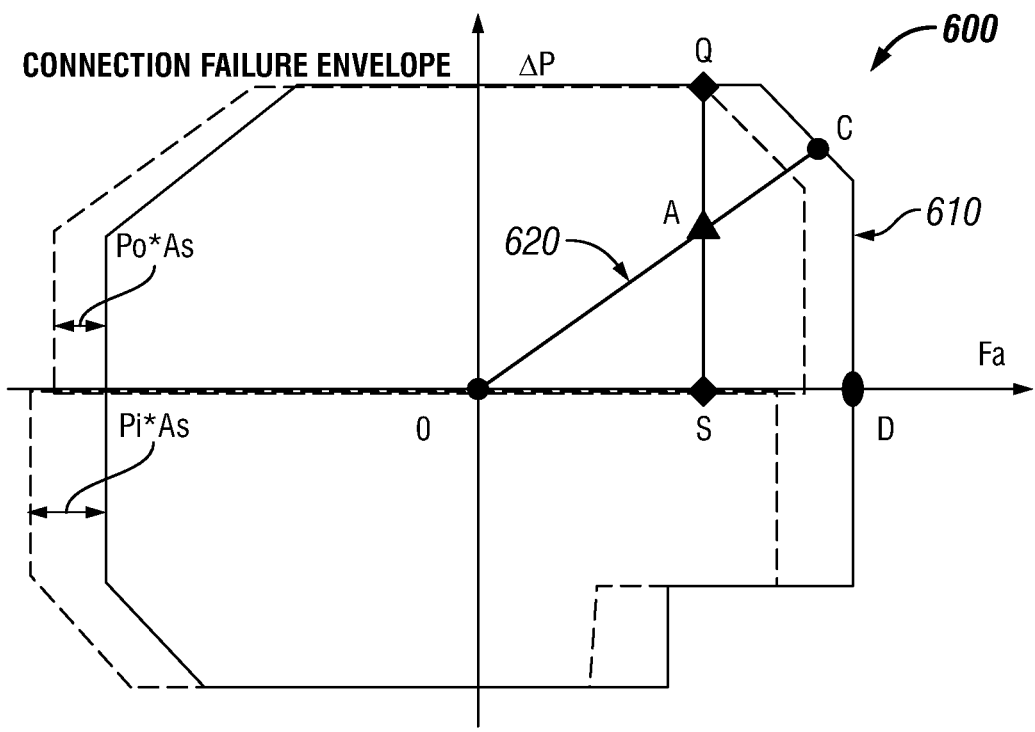
FIG. 6 is a 2D design limit envelope plot of a pipe connection, according to one or more embodiments.

FIG. 6 is a design limit plot 600 of an illustrative axial load (Fa) relative to differential pressure (ΔP) for a load point A corresponding to a connection between different tubular sections of a wellbore tubular. The different segments may be segments of a pipe, e.g., a casing or tubing string, disposed within the wellbore. Load point A may correspond to, for example, a point on a coupling, valve or other type of connector between the pipe segments. Similar to the load points that are shown relative to triaxial design limit envelope 410 in design limit plot 400 of FIG. 4, as described above, load point A is shown within design limit plot 600 relative to a connection failure envelope 602. Although connection failure envelope 602 is shown using a polygonal shape that differs from the curved shape of triaxial design limit envelope 410, connection failure envelope 602 may also represent a triaxial design limit envelope for triaxial loads expected for the design of the tubular section under downhole conditions. However, the triaxial loads may be triaxial stresses expected for a pipe connector under such load conditions. As described above, such load conditions may be associated with a particular load scenario being analyzed for the wellbore tubular design.

As connection failure envelope 602 and strength envelopes of ISO connectors generally are similar to the triaxial design limit envelopes used for segments of a pipe body, a similar shift in the position of connection failure envelope 602 to that described above with respect to triaxial design limit envelope 310 of FIG. 3 may be expected. Thus, like triaxial design limit envelope 310, internal and external pressures may cause connection failure envelope 602 to shift along the x-axis of design limit plot 600. As shown by the dotted lines in FIG. 6, portions of connection failure envelope 602 above and below the x-axis of design limit plot 600 may shift in different ways depending on the amount of internal and external pressures.

Accordingly, to ensure that connection failure envelope 602 as shown in design limit plot 600 also accounts for such counter-load pressures expected for the pipe connector design, equivalent axial load may be used in place of axial force for the x-axis. This allows connection failure envelope 602 as plotted within design limit plot 600 to accurately represent the effects of both loads and counter-load pressures on connector safety factors. In one or more embodiments, such a safety factor (SF) for a pipe connector may be based on a geometric relationship between different triaxial load points, e.g., as expressed by Equation (14):

$$SF = \frac{|OC|}{|OA|}$$

where O is the point of origin of a radial line 604 representing a triaxial load that passes through load point A, and C is the point at which radial line 604 intercepts connection failure envelope 602.

Assuming the intercept point (C) is located between two points (not shown) at coordinates $(F_i, \Delta P_i)$ and $(F_{i+1}, \Delta P_{i+1})$ on connection failure envelope 602, the geometric relationship may be used to define an analytical formula for calculating the safety factor, e.g., as expressed by Equation (15):

$$SF = \frac{\Delta P_i * F_i - F_{i+1} * \Delta P_i}{P_e(F_i - F_{i+1}) + F_{eq} * (\Delta P_{i+1} - \Delta P_i)}$$

where $F_{eq}$ is the equivalent axial load according to Equation (5) described above, $F_a$ is the axial load, $P_i$ is the internal pressure, $P_o$ is the external pressure, $P_e$ is differential pressure $(P_i - P_o)$, $\Delta P_i$ is the input burst/collapse rating at axial force $F_i$ and i is any integer value from 1 to N−1, where N represents the total number of envelope points.

Figure 7:
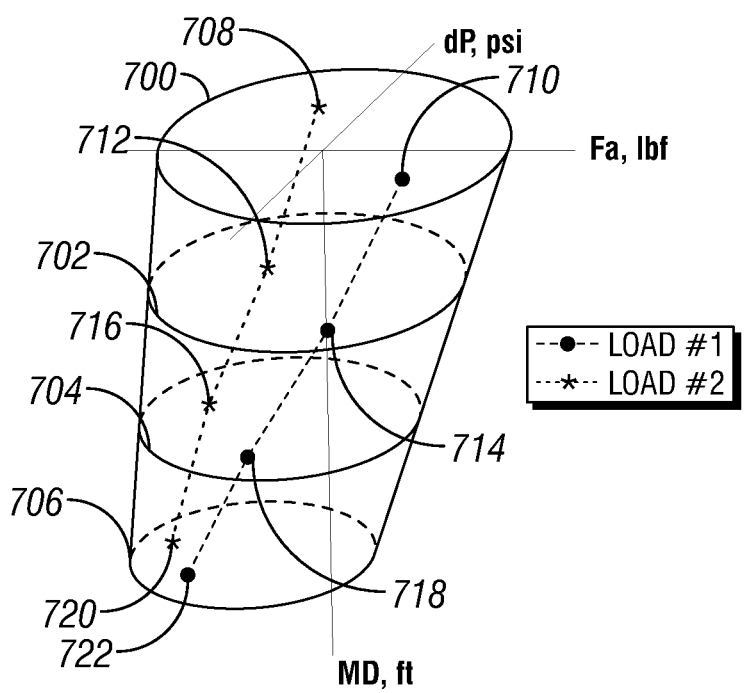
FIG. 7 is a three-dimensional (3D) design limit envelope plot, according to one or more embodiments.

When the above calculations are performed for each of the load points associated with tubular sections at specific depth for a particular load scenario for the borehole tubular, a 3D plot, such as the plot shown in FIG. 7, can be generated by the system 100 and output to the display 106.

The 3D plot shown in FIG. 7 illustrates the design limit envelopes 700-706 and loads 708-722 applied to tubular sections of the borehole tubular as a function of depth within the borehole. The loads 708-722 are determined at load points that correspond with points along the wellbore tubular where there is a change in thickness of the tubular sections, the formation surrounding the borehole transitions from one type of rock to another type of rock, planned locations of borehole equipment, or any abrupt change in conditions within the borehole or change in dimensions of the borehole tubular. The 3D plot shown in FIG. 7 allows a user 118 to quickly identify if the tubular sections that make up borehole tubular are sufficient for the two identified load scenarios. Additionally, a 3D plot allows a user 118 to determine if any tubular sections making up the borehole tubular can be adjusted, i.e., replaced with a lower cost tubular having a smaller design limit envelope, while still maintaining the integrity of the borehole tubular.

In addition to the considerations described above, the loss of metal within the tubular sections over time may also be considered when determining if a borehole tubular is sufficient for the planned downhole operations. Metal loss may be due to several factors, such as, but not limited to, wear and carbon dioxide corrosion. The estimated metal loss due to wear, W, can be expressed by Equation (16):

$$W = W_r * F * \pi D_j * RPM * 60t * L_j/L_p$$

where $W_f$ is wear factor, F is side force on tool joint, $D_j$ is the outer diameter of tool joints, RPM is the rotational speed of a drill pipe, t is the operation duration in hours, $L_j$ is the length of tool joints, $L_p$ is the length of drill pipe.

Metal loss due to carbon dioxide corrosion is due to a combination of two corrosion rates, the reaction controlled corrosion rate, $V_r$, and the mass-transfer controlled corrosion rate, $V_m$. The combined corrosion rate, $V_{corr}$ can be expressed as Equation (17):

$$\frac{1}{V_{corr}} = \frac{1}{V_r} + \frac{1}{V_m}$$

where $V_r$ and $V_m$ represent the maximum kinetic reaction and mass transfer rates.

For mild carbon steels commonly used in the oil and gas industry, the reaction controlled rate and the mass-transfer controlled rate can be expressed by Equations (18) and (19):

$$\log(V_r) = A_r - \frac{1119}{T+273} + 0.58 \log(f_{CO_2}) - 0.34(\text{pH}_{actual} - \text{pH}_{CO_2})$$

$$V_m = A_m \frac{U_{liq}^{0.8}}{D^{0.2}} f_{CO_2}$$

where $f_{CO2}$ is the fugacity (in bar) of $CO_2$, T is the temperature (in °C.), and $U_{liq}$ is the liquid velocity (in m/s), D is the internal pipe diameter (in m), $\text{pH}_{CO2}$ is the pH of pure water saturated with $CO_2$ at prevailing temperature and pressure, pHactual is the pH resulting from the presence of dissolved salts. The dissolved carbonate and bicarbonate salts are input parameters. $A_r$ and $A_m$ are model constants.

Figure 8A:
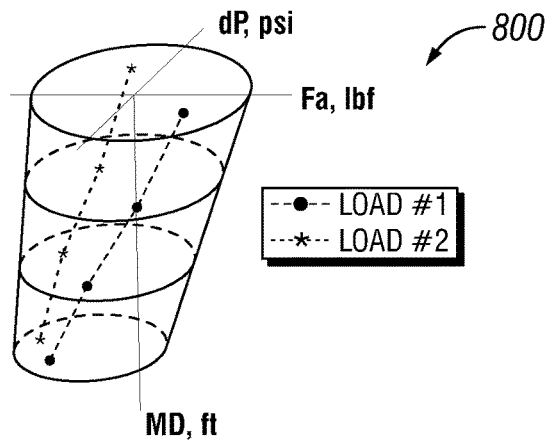
FIG. 8 is a 3D design limit envelope plot at three different timestamps, according to one or more embodiments.
Figure 8B:
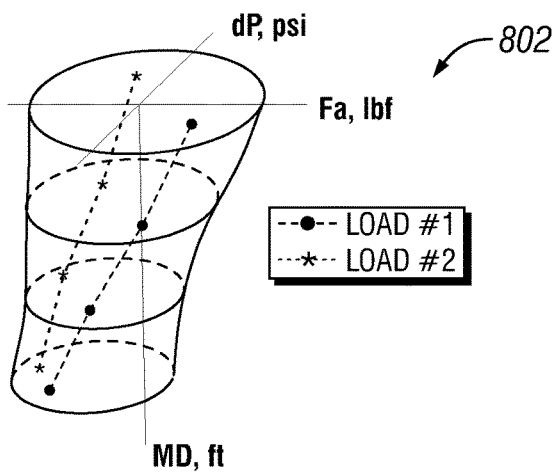
Figure 8C:
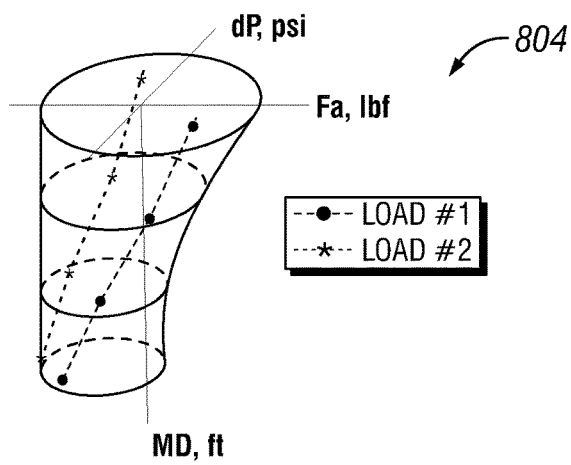

The metal loss within the tubular sections of the borehole tubular over time can then be taken into account when calculating design limit envelopes of the tubular sections. The metal loss leads to a reduction in the design limit envelopes over time, as shown in FIG. 8. 3D plot 800 illustrates the design limit envelopes at an initial timestamp, $T_1$, while 3D plots 802 and 804 illustrate the design limit envelopes at a second timestamp, $T_2$, and a third timestamp, $T_3$, respectively. The respective 3D plots can also be combined into a single four-dimensional (4D) plot, illustrating the change in design limit envelope over time.

Figure 9:
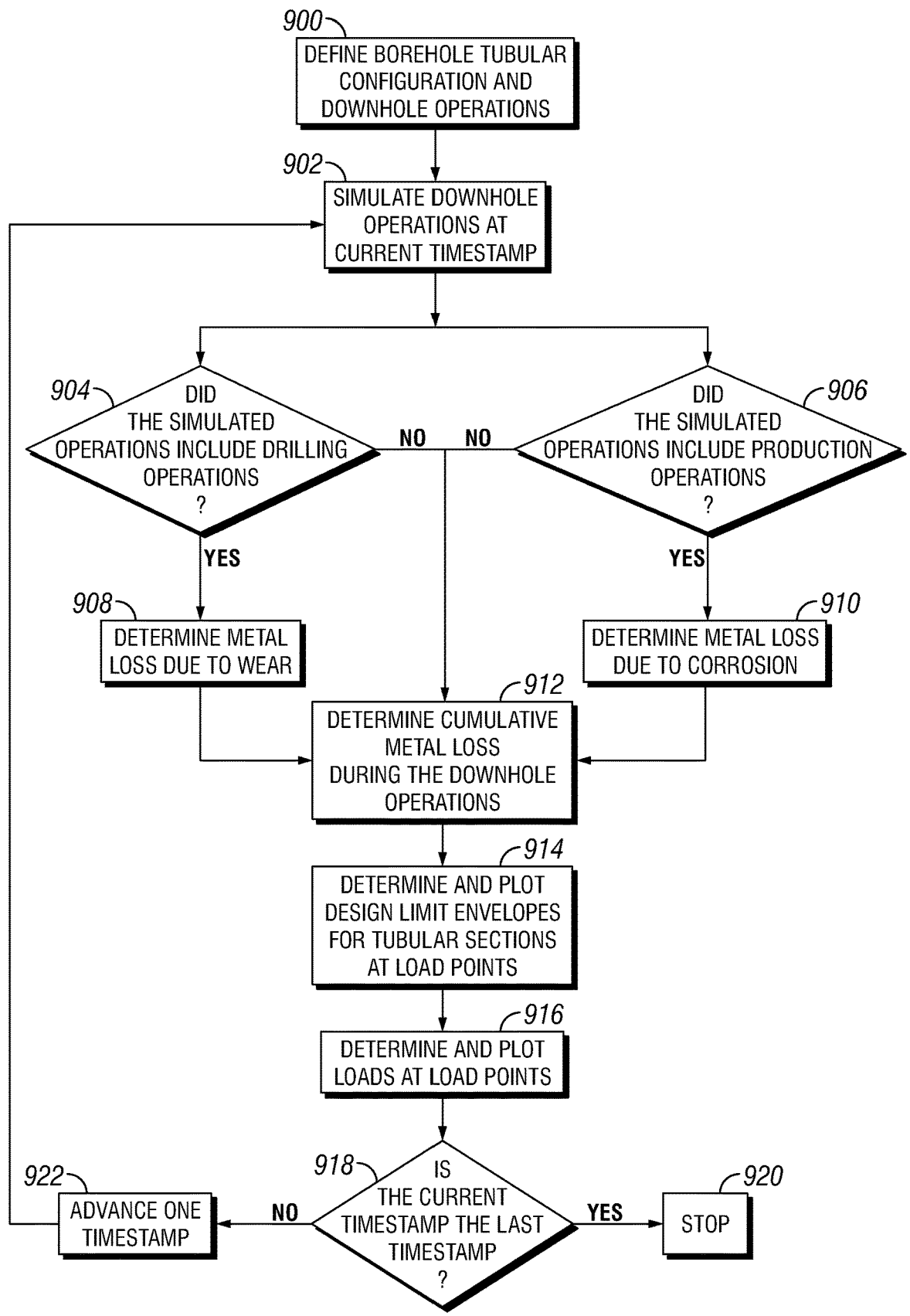
FIG. 9 is a flowchart of a method for creating a four-dimensional (4D) design-limits plot.

FIG. 9 is a flowchart of a method for creating a 4D plot illustrates the design limit envelopes and loads applied to tubular sections of the borehole tubular as a function of depth within the borehole over multiple timestamps, where each timestamp represents an interval of time or the completion of one or more borehole operations. The method described in reference to FIG. 9 is performed by the system 100 described above in reference to FIG. 1. However, the current disclosure is not thereby limited. The method may also be performed by other computer systems that include a processor capable of executing instructions stored on a non-transitory computer-readable medium.

In step 900, a borehole tubular configuration and one or more downhole operations are defined by a user. In another embodiment, the user may define the borehole parameters and a system, such as system 100 described above with reference to FIG. 1, will select a borehole tubular configuration based on the borehole parameters and the borehole operations.

Once the borehole tubular configuration and the downhole operations, the downhole operations at the current timestamp are simulated to determine load conditions at each of a plurality of load points associated with specific depths along the borehole, as shown in step 902 and described above with reference to FIG. 1. The specified depths may be associated with a change in thickness of the tubular sections, the formation surrounding the borehole transitions from one type of rock to another type of rock, planned locations of borehole equipment, or any abrupt change in conditions within the borehole or change in dimensions of the borehole tubular.

Once the simulation is performed, it is determined if any of the simulated borehole operations were drilling operations, as shown at 904, or production operations, as shown at 906. If the simulated operations included drilling operations, the metal loss within tubular sections of the borehole tubular due to the drilling operations is determined, as shown at 908. If the simulated operations included production operations, the metal loss within the tubular sections due to corrosion is determined, as shown at 910. Once the metal loss due to wear and/or corrosion is determined, the cumulative metal loss within the tubular sections is determined, as shown at 912.

After the cumulative metal loss for the tubular sections is determined, the design limit envelopes for the tubular sections at each of the load points used in the simulation is determined and plotted, as shown at 914. The design limit envelopes are determined as described above and also take metal loss and changes in yield strength due to the temperature into account. The design limit envelopes are then plotted as a function of depth within the borehole, as shown in FIG. 8.

After the design limit envelopes for the tubular sections at the load points are plotted, loads comprising axial loads and burst/collapse pressure for the load conditions at each of the load points are determined, as described above, and plotted, as shown at 916. Similar to the design limit envelopes, the loads are plotted as a function of depth within the borehole and align with the plots of the design limit envelopes.

Once the design limit envelopes and loads are plotted, it is then determined if the current timestamp is the last timestamp, as shown at 918. If the current timestamp is the last timestamp, the method is stopped since all design limit envelopes and loads have been plotted, as shown at 920. If the current timestamp is not the last timestamp, the method is repeated for the next timestamp, taking into account any metal loss from the previous timestamp, as shown at 922.

Figure 10:
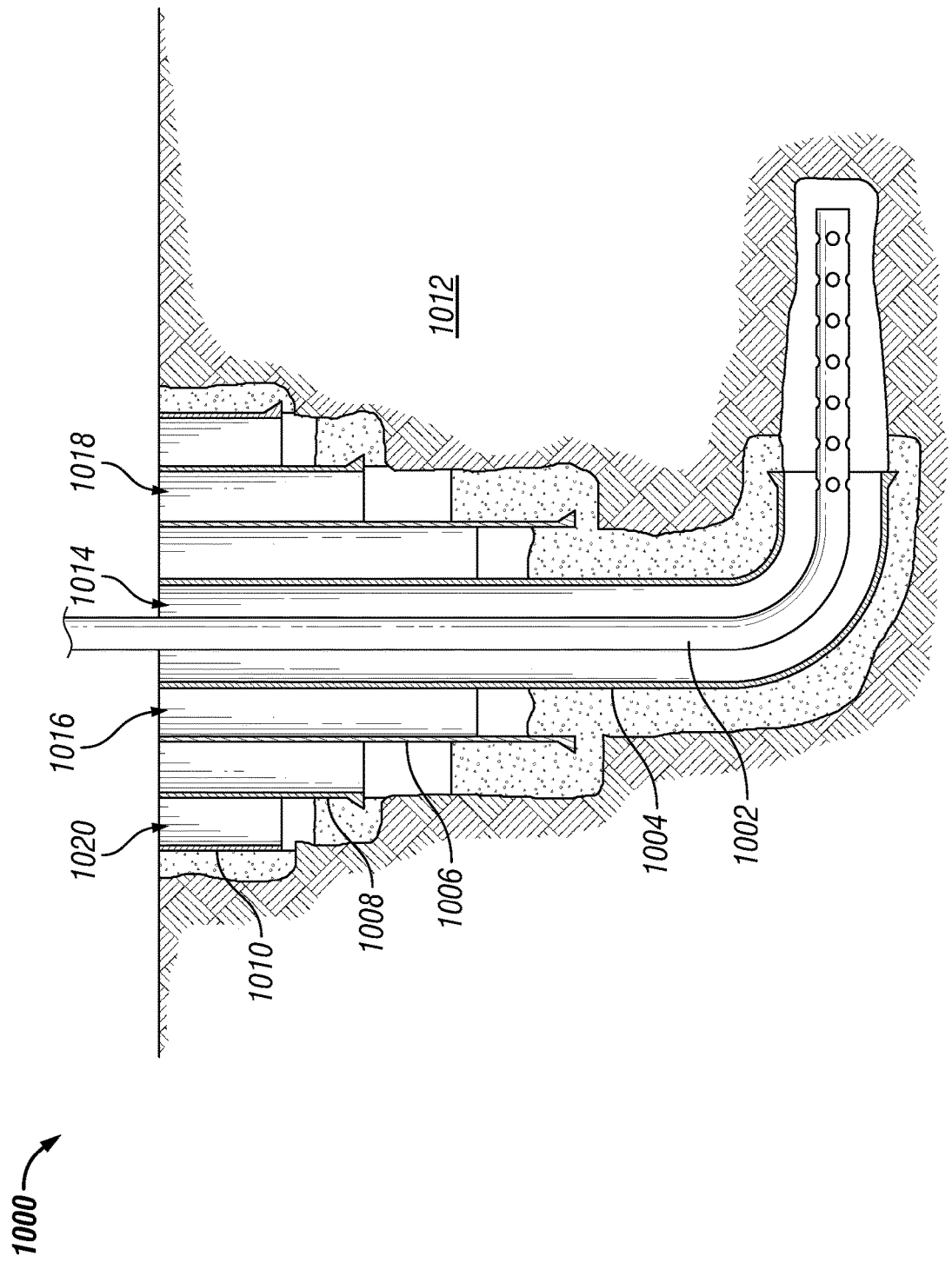
FIG. 10 is a cross-sectional view of a borehole with installed tubular sections, according to one or more embodiments.

After the design of a borehole tubular is selected and/or verified using the system 100 described above in reference to FIG. 1, tubular sections can be gathered to be installed within a borehole 1000, as shown in FIG. 10. The borehole 1000 has multiple borehole tubulars 1002, 1004, 1006, 1008, 1010, where at least the innermost borehole tubular 1002 is selected and/or verified using the system 100. As shown in FIG. 10, the borehole 1000 extends through a subterranean formation 1012. The borehole tubulars are concentrically placed within the borehole and define multiple annuli 1014, 1016, 1018, 1020. While shown with four concentric borehole tubulars, depending on the length of the borehole 1000, any number concentric borehole tubulars may be present.

Further examples include:

Example 1 is a method for designing a borehole tubular for use in a borehole. The method includes defining tubular sections that make up the borehole tubular. The method also includes defining a downhole operation that will be conducted using the borehole tubular at a first timestamp. The method further includes determining loads that will be applied to each of the tubular sections at respective specific depths along the borehole during the downhole operation at the first timestamp. The method also includes determining a design limit envelope for each of the tubular sections at the first timestamp based on design parameters of the tubular section and the specific depth of the tubular section at the first timestamp. The method further includes displaying a three-dimensional (3D) plot of the design limit envelopes of the tubular sections and the loads applied to the tubular sections at the first timestamp as a function of depth within the borehole on a display.

In Example 2, the embodiments of any preceding paragraph or combination thereof further include calculating metal loss within each of the tubular sections at the first timestamp. Additionally, determining the design limit envelope for each of the tubular sections at the first timestamp includes determining the design limit envelope for each of the tubular sections based on the design parameters of the tubular section, the specific depth of the tubular section, and the metal loss within the tubular section at the first timestamp.

In Example 3, the embodiments of any preceding paragraph or combination thereof further include adjusting one or more of the tubular sections based on the loads at the first timestamp and the design limit envelope for each of the tubular sections at the first timestamp.

In Example 4, the embodiments of any preceding paragraph or combination thereof further include defining a downhole operation that will be conducted using the borehole tubular at a second timestamp. The method also includes determining loads that will be applied to each of the tubular sections at respective specific depths along the borehole during the downhole operation at the second timestamp. The method further includes determining a design limit envelope for each of the tubular sections at the second timestamp based on the design parameters of the tubular section and the specific depth of the tubular section at the second timestamp. The method also includes displaying a four-dimensional (4D) plot of the design limit envelopes of the tubular sections and the loads applied to the tubular sections at the first timestamp and the second timestamp as a function of depth on the display.

In Example 5, the embodiments of any preceding paragraph or combination thereof further include calculating metal loss within each of the tubular sections at the first time stamp and the second timestamp. Additionally, determining the design limit envelope for each of the tubular sections at the first timestamp includes determining the design limit envelope for each of the tubular sections based on the design parameters of the tubular section, the specific depth of the tubular section, and the metal loss within the tubular section at the first timestamp. Further, determining the design limit envelope for each of the tubular sections at the second timestamp includes determining the design limit envelope for each of the tubular sections at the second timestamp based on the design parameters of the tubular section, the specific depth of the tubular section, and the metal loss within the tubular section at the first timestamp and the second timestamp.

In Example 6, the embodiments of any preceding paragraph or combination thereof further include adjusting one or more of the tubular sections based on the loads at the second timestamp and the design limit envelope for each of the tubular sections at the second time stamp.

In Example 7, the embodiments of any preceding paragraph or combination thereof further include wherein displaying the 4D plot of the design limit envelopes of the tubular sections and the loads comprises displaying a second three-dimensional 3D plot of the design limit envelopes of the tubular sections and the loads applied to the tubular sections at the second timestamp as a function of depth on the display.

In Example 8, the embodiments of any preceding paragraph or combination thereof further include gathering tubular sections.

Example 9 is a system for designing a borehole tubular. The system includes a display and a processor in electronic communication with the display. The processor is programmed to define tubular sections that make up the borehole tubular. The processor is further programmed to define a downhole operation that will be conducted using the borehole tubular at a first timestamp. The processor is also programmed to determine loads that will be applied to each of the tubular sections at respective specific depths along the borehole during the downhole operation at the first timestamp. The processor is further programmed to determine a design limit envelope for each of the tubular sections at the first timestamp based on design parameters of the tubular section and the specific depth of the tubular section at the first timestamp. The processor is also programmed to display a 3D plot of the design limit envelopes of the tubular sections and the loads applied to the tubular sections at the first timestamp as a function of depth within the borehole on the display.

In Example 10, the embodiments of any preceding paragraph or combination thereof further include wherein the processor is further programmed to calculate metal loss within each of the tubular sections at the first timestamp. Additionally, determining the design limit envelope for each of the tubular sections at the first timestamp comprises determining the design limit envelope for each of the tubular sections based on the design parameters of the tubular section, the specific depth of the tubular section, and the metal loss within the tubular section at the first timestamp In Example 11, the embodiments of any preceding paragraph or combination thereof further include wherein the processor is further programmed to adjust one or more of the tubular sections based on the loads at the first timestamp and the design limit envelope for each of the tubular sections at the first timestamp.

In Example 12, the embodiments of any preceding paragraph or combination thereof further include wherein the processor is further programmed to define a downhole operation that will be conducted using the borehole tubular at a second timestamp. The processor is also programmed to determine loads that will be applied to each of the tubular sections at respective specific depths along the borehole during the downhole operation at the second timestamp. The processor is further programmed to determine a design limit envelope for each of the tubular sections at the second timestamp based on the design parameters of the tubular section and the specific depth of the tubular section at the second timestamp. The processor is also programmed to display a 4D plot of the design limit envelopes of the tubular sections and the loads applied to the tubular sections at the first timestamp and the second timestamp as a function of depth within the borehole on the display.

In Example 13, the embodiments of any preceding paragraph or combination thereof further include wherein the processor is further programmed to calculate metal loss within each of the tubular sections at first timestamp and the second timestamp. Additionally, determining the design limit envelope for each of the tubular sections at the first timestamp includes determining the design limit envelope for each of the tubular sections based on the design parameters of the tubular section, the specific depth of the tubular section, and the metal loss within the tubular section at the first timestamp. Further, determine the design limit envelope for each of the tubular sections at the second timestamp includes determining the design limit envelope for each of the tubular sections at the second timestamp based on the design parameters of the tubular section, the specific depth of the tubular section, and the metal loss within the tubular section at the first timestamp and the second timestamp.

In example 14, the embodiments of any preceding paragraph or combination thereof further include wherein the processor is further programmed to adjust one or more of the tubular sections based on the loads at the second timestamp and the design limit envelope for each of the tubular sections at the second timestamp.

Example 15 is a non-transitory computer readable medium comprising instructions which, when executed by a processor, enables the processor to perform a method for designing a borehole tubular. The method includes defining tubular sections that make up the borehole tubular. The method also includes defining a downhole operation that will be conducted using the borehole tubular at a first timestamp. The method further includes determining loads that will be applied to each of the tubular sections at respective specific depths along the borehole during the downhole operation at the first timestamp. The method also includes determining a design limit envelope for each of the tubular sections at the first timestamp based on design parameters of the tubular section and the specific depth of the tubular section at the first timestamp. The method further includes displaying a 3D plot of the design limit envelopes of the tubular sections and the loads applied to the tubular sections at the first timestamp as a function of depth within the borehole.

In Example 16, the embodiments of any preceding paragraph or combination thereof further include wherein the method further includes calculating metal loss within each of the tubular sections at the first timestamp. Additionally, determining the design limit envelope for each of the tubular sections at the first timestamp includes determining the design limit envelope for each of the tubular sections based on the design parameters of the tubular section, the specific depth of the tubular section, and the metal loss within the tubular section at the first timestamp.

In Example 17, the embodiments of any preceding paragraph or combination thereof further include wherein the method further includes adjusting one or more of the tubular sections based on the loads at the first timestamp and the design limit envelope for each of the tubular sections at the first timestamp.

In Example 18, the embodiments of any preceding paragraph or combination thereof further include wherein the method further includes defining a downhole operation that will be conducted using the borehole tubular at a second timestamp. The method also includes determining loads that will be applied to each of the tubular sections at respective specific depths along the borehole during the downhole operation at the second timestamp. The method further includes determining a design limit envelope for each of the tubular sections at the second timestamp based on the design parameters of the tubular section and the specific depth of the tubular section at the second timestamp. The method also includes displaying a 4D plot of the design limit envelopes of the tubular sections and the loads applied to the tubular sections at the first timestamp and the second timestamp as a function of depth within the borehole.

In Example 19, the embodiments of any preceding paragraph or combination thereof further include wherein the method further includes calculating metal loss within each of the tubular sections at the first time stamp and the second timestamp. Additionally, determining the design limit envelope for each of the tubular sections at the first timestamp includes determining the design limit envelope for each of the tubular sections based on the design parameters of the tubular section, the specific depth of the tubular section, and the metal loss within the tubular section at the first timestamp. Further, determining the design limit envelope for each of the tubular sections at the second timestamp includes determining the design limit envelope for each of the tubular sections at the second timestamp based on the design parameters of the tubular section, the specific depth of the tubular section, and the metal loss within the tubular section at the first timestamp and the second timestamp In Example 20, the embodiments of any preceding paragraph or combination thereof further include wherein the method further includes adjusting one or more of the tubular sections based on the loads at the second timestamp and the design limit envelope for each of the tubular sections at the second timestamp.

For the embodiments and examples above, a non-transitory machine-readable non-transitory computer readable medium device can comprise instructions stored thereon, which, when performed by a machine, cause the machine to perform operations, the operations comprising one or more features similar or identical to features of methods and techniques described above. The physical structures of such instructions may be operated on by one or more processors. A system to implement the described algorithm may also include an electronic apparatus and a communications unit. The system may also include a bus, where the bus provides electrical conductivity among the components of the system. The bus can include an address bus, a data bus, and a control bus, each independently configured. The bus can also use common conductive lines for providing one or more of address, data, or control, the use of which can be regulated by the one or more processors. The bus can be configured such that the components of the system can be distributed. The bus may also be arranged as part of a communication network allowing communication with control sites situated remotely from system.

In various embodiments of the system, peripheral devices such as displays, additional non-transitory computer readable medium, and/or other control devices that may operate in conjunction with the one or more processors and/or the memory modules. The peripheral devices can be arranged to operate in conjunction with display unit(s) with instructions stored in the memory module to implement the user interface to manage the display of the anomalies. Such a user interface can be operated in conjunction with the communications unit and the bus. Various components of the system can be integrated such that processing identical to or similar to the processing schemes discussed with respect to various embodiments herein can be performed.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

The embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for designing a borehole tubular for use in a borehole, the method comprising:
defining tubular sections that make up the borehole tubular;
defining a downhole operation that will be conducted using the borehole tubular at a first timestamp and a second timestamp;
determining loads that will be applied to each of the tubular sections at respective specific depths along the borehole during the downhole operation at the first timestamp and the second timestamp;
determining a design limit envelope for each of the tubular sections at the first timestamp and the second timestamp based on design parameters of the tubular section and the specific depth of the tubular section at the first timestamp and the second timestamp; and
displaying a four-dimensional (4D) plot of the design limit envelopes of the tubular sections and the loads applied to the tubular sections at the first timestamp and the second timestamp as a function of depth within the borehole on a display such that the loads are displayed as being within or outside of the design limit envelopes for the tubular sections,
wherein a user can customize different visual aspects of the 4D plot of the design limit envelopes, via at least one of a control menu or a dialog window, to confirm if the loads are within the design limit envelopes.

2. The method of claim 1, further comprising calculating metal loss within each of the tubular sections at the first timestamp, wherein determining the design limit envelope for each of the tubular sections at the first timestamp comprises determining the design limit envelope for each of the tubular sections based on the design parameters of the tubular section, the specific depth of the tubular section, and the metal loss within the tubular section at the first timestamp.

3. The method of claim 1, further comprising adjusting one or more of the tubular sections based on the loads at the first timestamp and the design limit envelope for each of the tubular sections at the first timestamp.

4. The method of claim 1, further comprising:
calculating metal loss within each of the tubular sections at the first time stamp and the second timestamp;
wherein determining the design limit envelope for each of the tubular sections at the first timestamp comprises determining the design limit envelope for each of the tubular sections based on the design parameters of the tubular section, the specific depth of the tubular section, and the metal loss within the tubular section at the first timestamp; and
wherein determining the design limit envelope for each of the tubular sections at the second timestamp comprises determining the design limit envelope for each of the tubular sections at the second timestamp based on the design parameters of the tubular section, the specific depth of the tubular section, and the metal loss within the tubular section at the first timestamp and the second timestamp.

5. The method of claim 1, further comprising adjusting one or more of the tubular sections based on the loads at the second timestamp and the design limit envelope for each of the tubular sections at the second timestamp.

6. The method of claim 1, wherein displaying the 4D plot of the design limit envelopes of the tubular sections and the loads further comprises displaying the design limit envelopes via a graphical user interface (GUI) configured to allow the user to switch between different views of the 4D plot.

7. The method of claim 1, further comprising gathering tubular sections.

8. A system for designing a borehole tubular, the system comprising:
a display; and
a processor in electronic communication with the display, the processor programmed to:
define tubular sections that make up the borehole tubular;
define a downhole operation that will be conducted using the borehole tubular at a first timestamp and a second timestamp;
determine loads that will be applied to each of the tubular sections at respective specific depths along the borehole during the downhole operation at the first timestamp and the second timestamp;
determine a design limit envelope for each of the tubular sections at the first timestamp and the second timestamp based on design parameters of the tubular section and the specific depth of the tubular section at the first timestamp and the second timestamp; and
display a four-dimensional (4D) plot of the design limit envelopes of the tubular sections and the loads applied to the tubular sections at the first timestamp and the second timestamp as a function of depth within the borehole on the display such that the loads are displayed as being within or outside of the design limit envelopes for the tubular sections,
wherein a user can customize different visual aspects of the 4D plot of the design limit envelopes, via at least one of a control menu or a dialog window, to confirm if the loads are within the design limit envelopes.

9. The system of claim 8, wherein the processor is further programmed to calculate metal loss within each of the tubular sections at the first timestamp, wherein determine the design limit envelope for each of the tubular sections at the first timestamp comprises determining the design limit envelope for each of the tubular sections based on the design parameters of the tubular section, the specific depth of the tubular section, and the metal loss within the tubular section at the first timestamp.

10. The system of claim 8, wherein the processor is further programmed to adjust one or more of the tubular sections based on the loads at the first timestamp and the design limit envelope for each of the tubular sections at the first timestamp.

11. The system of claim 8, wherein:
the processor is further programmed to calculate metal loss within each of the tubular sections at first timestamp and the second timestamp;
determining the design limit envelope for each of the tubular sections at the first timestamp comprises determining the design limit envelope for each of the tubular sections based on the design parameters of the tubular section, the specific depth of the tubular section, and the metal loss within the tubular section at the first timestamp; and
determining the design limit envelope for each of the tubular sections at the second timestamp comprises determining the design limit envelope for each of the tubular sections at the second timestamp based on the design parameters of the tubular section, the specific depth of the tubular section, and the metal loss within the tubular section at the first timestamp and the second timestamp.

12. The system of claim 8, wherein the processor is further programmed to adjust one or more of the tubular sections based on the loads at the second timestamp and the design limit envelope for each of the tubular sections at the second timestamp.

13. A non-transitory computer readable medium comprising instructions which, when executed by a processor, enables the processor to perform a method for designing a borehole tubular, the method comprising:

defining tubular sections that make up the borehole tubular;

defining a downhole operation that will be conducted using the borehole tubular at a first timestamp and a second timestamp;

determining loads that will be applied to each of the tubular sections at respective specific depths along the borehole during the downhole operation at the first timestamp and the second timestamp;

determining a design limit envelope for each of the tubular sections at the first timestamp and the second timestamp based on design parameters of the tubular section and the specific depth of the tubular section at the first timestamp and the second timestamp; and displaying a four-dimensional (4D) plot of the design limit envelopes of the tubular sections and the loads applied to the tubular sections at the first timestamp and the second timestamp as a function of depth within the borehole such that the loads are displayed as being within or outside of the design limit envelopes for the tubular sections, wherein a user can customize different visual aspects of the 4D plot of the design limit envelopes, via at least one of a control menu or a dialog window, to confirm if the loads are within the design limit envelopes.

14. The non-transitory computer readable medium of claim 13, wherein the method further comprises calculating metal loss within each of the tubular sections at the first timestamp, wherein determining the design limit envelope for each of the tubular sections at the first timestamp comprises determining the design limit envelope for each of the tubular sections based on the design parameters of the tubular section, the specific depth of the tubular section, and the metal loss within the tubular section at the first timestamp.

15. The non-transitory computer readable medium of claim 13, wherein the method further comprises adjusting one or more of the tubular sections based on the loads at the first timestamp and the design limit envelope for each of the tubular sections at the first timestamp.

16. The non-transitory computer readable medium of claim 13, wherein:

the method further comprises calculating metal loss within each of the tubular sections at the first time stamp and the second timestamp;

determining the design limit envelope for each of the tubular sections at the first timestamp comprises determining the design limit envelope for each of the tubular sections based on the design parameters of the tubular section, the specific depth of the tubular section, and the metal loss within the tubular section at the first timestamp; and determining the design limit envelope for each of the tubular sections at the second timestamp comprises determining the design limit envelope for each of the tubular sections at the second timestamp based on the design parameters of the tubular section, the specific depth of the tubular section, and the metal loss within the tubular section at the first timestamp and the second timestamp.

17. The non-transitory computer readable medium of claim 13, wherein the method further comprises adjusting one or more of the tubular sections based on the loads at the second timestamp and the design limit envelope for each of the tubular sections at the second timestamp.

\* \* \* \* \*